United States Patent [19]

Koblischek et al.

[11] Patent Number: 4,670,208
[45] Date of Patent: Jun. 2, 1987

[54] METHOD OF MANUFACTURING MACHINE SUPPORTS BY MEANS OF CONCRETE POLYMER

[75] Inventors: Peter Koblischek, Parkstrasse 15, D-6000 Frankfurt/M. 1; Rudolf Nicklau, Seeheim-Jugenheim, both of Fed. Rep. of Germany

[73] Assignee: Peter Koblischek, Fed. Rep. of Germany

[21] Appl. No.: 292,085

[22] Filed: Aug. 11, 1981

[30] Foreign Application Priority Data

Aug. 16, 1980 [DE] Fed. Rep. of Germany ....... 3030814

[51] Int. Cl.$^4$ .................. B28B 23/00; B28B 1/52; B23Q 1/02
[52] U.S. Cl. .................. 264/250; 248/1; 248/637; 248/676; 248/679; 264/122; 264/255; 264/256; 264/271.1; 264/331.18; 264/333; 524/650; 524/779
[58] Field of Search .................. 264/331.18, 256, 250, 264/255, 271.1, 333, 122; 248/679, 678, 637, 639, 676; 524/779, 650

[56] References Cited

U.S. PATENT DOCUMENTS

| | | | |
|---|---|---|---|
| 2,827,385 | 5/1958 | Lyons | 106/90 |
| 2,842,955 | 7/1958 | Pedersen | 248/679 X |
| 2,916,233 | 12/1959 | Ecker | 248/679 |
| 3,066,449 | 12/1962 | Cramer, Jr. | 248/678 X |
| 3,334,850 | 8/1967 | Jackson et al. | 248/679 |
| 3,361,399 | 1/1968 | Hestand et al. | 248/679 |
| 3,538,036 | 11/1970 | Peters et al. | 106/90 X |
| 3,692,728 | 9/1972 | Bonnel | 524/650 |
| 3,713,620 | 1/1973 | Tkach | 248/678 |
| 3,722,845 | 3/1973 | Unger | 248/679 X |
| 3,781,396 | 12/1973 | Okuda et al. | 264/331.18 X |
| 3,850,651 | 11/1974 | Duncan et al. | 106/90 |
| 4,024,098 | 5/1977 | Yamaguchi et al. | 524/650 X |
| 4,043,826 | 8/1977 | Hum | 106/90 |
| 4,050,659 | 9/1977 | McCannon et al. | 248/678 X |
| 4,066,723 | 1/1978 | King et al. | 264/256 X |
| 4,088,804 | 5/1978 | Cornwell et al. | 264/256 X |
| 4,197,225 | 4/1980 | Emmons et al. | 524/650 |

FOREIGN PATENT DOCUMENTS

| | | | |
|---|---|---|---|
| 1248381 | 8/1967 | Fed. Rep. of Germany | 248/679 |
| 1253629 | 11/1967 | Fed. Rep. of Germany | . |
| 2058274 | 6/1971 | Fed. Rep. of Germany | 106/90 |
| 1380351 | 10/1964 | France | 248/679 |
| 1540334 | 9/1968 | France | 106/90 |
| 2239433 | 4/1974 | France | 106/90 |
| 41-12619 | 7/1966 | Japan | 106/90 |
| 41-12740 | 7/1966 | Japan | 106/90 |
| 44-4215 | 2/1969 | Japan | 106/90 |
| 52-14842 | 2/1977 | Japan | 248/679 |
| 53-39444 | 10/1978 | Japan | 524/650 |
| 54-924 | 1/1979 | Japan | 106/90 |
| 57-179058 | 11/1982 | Japan | 106/90 |
| 59-13684 | 1/1984 | Japan | 524/650 |
| 1014795 | 12/1965 | United Kingdom | 106/90 |
| 1556941 | 12/1979 | United Kingdom | . |
| 392035 | 12/1972 | U.S.S.R. | 106/90 |
| 629191 | 9/1978 | U.S.S.R. | 106/90 |

OTHER PUBLICATIONS

*Hackh's Chemical Dictionary*, Fourth Edition, completely revised and edited by Julius Grant, New York, McGraw-Hill, c. 1972, pp. 436, 578, 579.

"Motema-AC: The Non-Metallic Cast Material", Helgard Koblischek Konjakburo fur Polymerbeton, Frankfurt, Germany, 1984, 16 pp.

Neumann, M. and B. V. Osten-Sacken, "Motema-On the Endurance Limit of Acrylic Concrete and Its Effects on Construction", in *Betonwerk & Fertigteil-Technik*, vol. 9, 1983, 7 pp. (reprint).

(List continued on next page.)

*Primary Examiner*—Philip Anderson
*Attorney, Agent, or Firm*—James C. Wray

[57] ABSTRACT

High-quality machine parts, e.g. machine supports, are manufactured of concrete polymer on the basis of methacrylate monomer polymerizing at room temperature and of aggregates. The monomer used has a dynamic viscosity of less than 10 mPas 10cP, preferably of 1–10 mPas 10cP. The admixed starter system comprises an organic peroxide and an aromatic tertiary amine, the latter being dissolved in the methacrylate monomer.

20 Claims, 8 Drawing Figures

OTHER PUBLICATIONS

Schulz, H. and R. G. Nicklau, "Machine Tool Frames made of Polymer Concrete", in *Werkstatt und Betrieb,* vol. 114, No. 10, 1981, pp. 747-752, 14 pp. (reprint).

*Machinery and Production Engineering,* "Machine Beds—Concrete Goes into the Mix", Oct. 10, 1979, pp. 67, 68.

"Werkzeugmaschinengestelle aus Epoxideharzbeton", in *Werkstatt und Betrib,* vol. 9, No. 112, Sep. 1979, pp. 609, 610.

Vollmer, F., "Polymerbeton-oft die Bessere Alternative", in *Industrie Anzeiger,* vol. 102, No. 35, May 2, 1980, pp. 21-24.

Grab, H. and P. H. Theimert, "WB-Lageberichts Beton im Werkzeugmaschinenbau", in *Werkstatt und Betrieb,* vol. 109, (1976), pp. 195-202.

Seehafer, Wolfgang, "Acryl-Beton und Seine Anwendung bei der Deutschen Bundesbahn", in *EI der Eisenbahn Ingenieur,* vol. 30, No. 11, (1979) pp. 463-467.

*Quantities and Units of Measurement: A Dictionary and Handbook,* J. V. Drazil, London, Mansell Publishing, 1983, pp. 12, 13, 118, 119, 122, 123, 254, 255.

Brydson, J. A., *Plastics Materials,* Princeton, N.J., D. Van Nostrand, c. 1966, pp. 229-234.

*Hackh's Chemical Dictionary,* Fourth Edition, completely revised and edited by Julius Grant, New York, McGraw-Hill, c. 1972, p. 713.

METHOD OF MANUFACTURING MACHINE SUPPORTS BY MEANS OF CONCRETE POLYMER

BACKGROUND OF THE INVENTION

1. Field of the Invention

This invention relates in general to the construction of machine parts and in particular to a new and useful method of manufacturing machine supports by means of concrete polymer.

2. Brief Description of the Prior Art

It is known by the published German application No. DE-OS 27 43 396 to manufacture machine supports for machine tools from a mechanical mixture of sand, gravel or broken stones and a multiple-component synthetic material, e.g. epoxide resin or polyester resin.

Several difficulties arose in this process of manufacture and has up to now impeded a general introduction of this process for manufacturing machine supports and the like.

The published German application No. DE-AS 12 53 629 describes a process for manufacturing and repairing platforms of roadways, of airports runways and taxiways, using essentially granular stones such as chips, gravel, sand; in this process the aforesaid materials are mixed with methylmethacrylate, this mixture is laid into the road foundation or onto the place to be repaired and is hardened by polymerization of the monomer under the influence of an accelerator or an accelerator system acting at normal temperature.

In this known process a polymerisate dispersible in methylmethacrylate, in particular polymethylmethacrylate, is admixed to the stone material, and this mixture is worked before the monomers disperse homogeneously or dissolve in the polymerisate particles.

This known process, however, is not applicable to the manufacture of machine supports and similar products as the mechanical properties which may be satisfactory for the intended use, are by no means sufficient to support stresses arising in machine supports and similar structural parts.

SUMMARY OF THE INVENTION

Machine parts, e.g. machine supports, are manufactured by means of polymer concrete using methacrylate monomer polymerizing at room temperature with a dynamic viscosity of less than 10 mPas 10 cP and admixing to the monomer and/or to the aggregate particles a starter system which contains peroxide and forms radicals. Plate-shaped structural parts of steel or of synthetic material, e.g. guiding ways, can be inserted into the surface of the machine part consisting of concrete polymer.

It is advantageous to admix a pulverized organic peroxide to a polymeric methylmethacrylate powder and to use as a starter system an organic peroxide and an aromatic tertiary amine.

The machine part can also consist of an iron construction which is filled up with methacrylic concrete.

These machine parts resist to aggressive media such as cutting oils and have, compared to machine supports of gray cast iron or cast steel or welded steel constructions, an essentially higher, at least six times greater, damping power so that when doing lathe work for instance, no chatter marks occur even at an essentially increased cutting speed.

These machine supports proved to have a high flexural strength and simultaneously a high damping power.

DESCRIPTION OF THE INVENTION AND PREFERRED EMBODIMENTS

Figure 1:
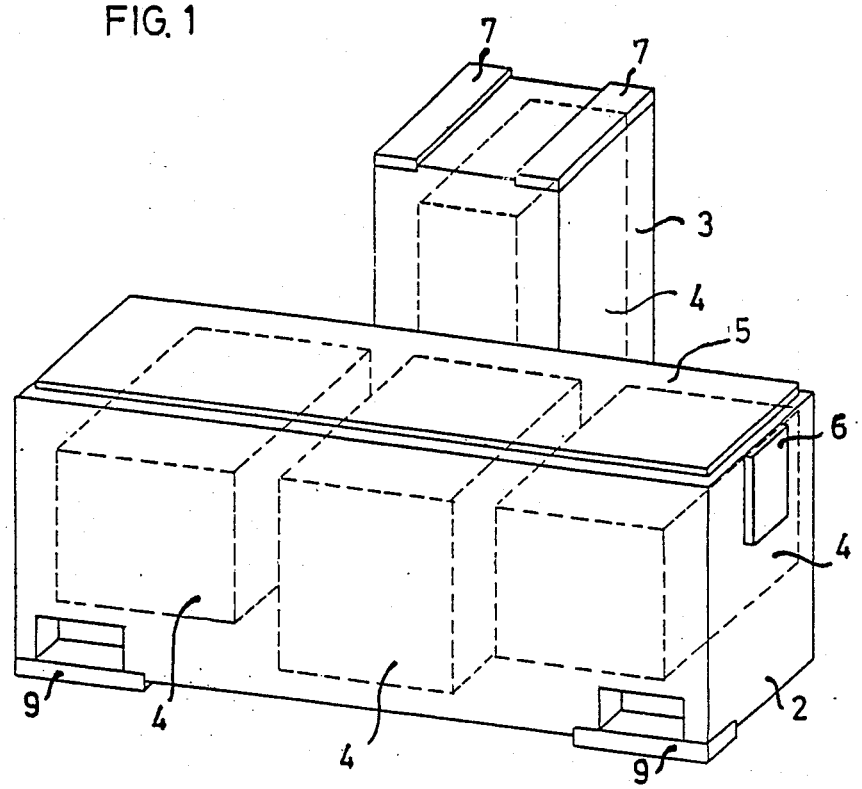
FIG. 1 is an isometric representation of a machine support for a high-efficiency milling machine.

FIG. 1 shows a machine support for a milling machine of high milling efficiency. The machine support shown in the figure comprises a longitudinal part 2 of essentially parallelepiped-shape and a tower part 3 of essentially parallelepiped-shape, the two being made in one piece of the same material and consisting essentially of acrylic concrete. The longitudinal part 2 as well as the tower part 3 comprises parallelepiped-shaped intercalations 4 of polyurethane foam which, during the manufacturing process, are poured in as a lost core to save material and to essentially reduce the weight of the manufactured product.

Stiffening steel plates 5, 6, and 7 are cast into the parallelepiped-shaped longitudinal part 2 and into the tower part 3.

These steel plates serve for mounting further structural parts. The automatic advance of the milling machine is mounted onto the steel plate 5 and is rigidly fastened thereto by means of screws. The main drive of the automatic advance is flanged to the steel plates 6, and the milling spindle unity is mounted onto both parallel plates 7. Furthermore the machine support comprises cast-in feet 9; above these feet are provided recesses 10 which can facilitate the transportation and which are provided to receive adjusting screws by means of which the machine can be adjusted horizontally at its working place.

To manufacture the machine support as shown in partially schematically simplified manner in FIG. 1, either the parallelepiped-shaped longitudinal part 2 and the tower part 3 are cast together in one mould, or the parallelepiped-shaped longitudinal part 2 is cast in a mould and then, after its hardening, the parallelepiped-shaped tower part 3 is cast thereto in an additional mould and thus rigidly bonded to part 2.

The steel plates 5, 6, and 7 are inserted into the mould at the corresponding places; in some cases it may be useful to fix the steel plate 6 and also the feet 9 to the walls of the mould from outside by means of screws.

The mixture of aggregates and methacrylate monomer and starting system is poured into the appropriately prepared mould. It is advantageous to first mix the dry organic peroxide and the poly(methacrylate) resin powder to form a starting system and then to admix to this dry mixture a methacrylate monomer of low viscosity. First only a part of this mixture is poured into the mould, then the parallelepiped-shaped intercalations 4 of polyurethane foam are inserted and then the mould is filled up to the provided height. It may be useful to provide the machine support with a gel coat. While pouring into the mould the acrylic cement is densified by vibration and eventually by an additional evacuation.

Figure 2:
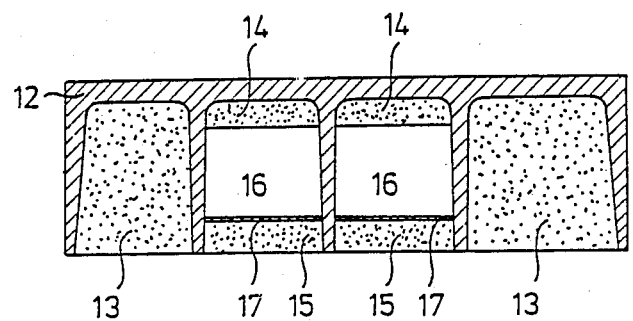
FIG. 2 is a vertical sectional view through a machine support of a grinding machine.

The machine support of a grinding machine as shown in FIG. 2 in a vertical cross-section view, comprises a formed part 12 of cast steel thus forming its surface. The cavities between the individual ribs of this formed part are filled up with a layer 13 of acrylic concrete; the cavities between the middle ribs are filled up in the upper part with layers 14 and in the lower part with layers 15 of acrylic concrete. The cavities 16 are either sealed by sheet parts 17 to avoid any penetration of acrylic concrete when manufacturing the layers 15, or they are filled with inserted blocs of foam material, e.g. foamed polyurethane resin. In some cases it may be advantageous to use welded steel constructions instead of a foamed part of cast iron.

Compared to the hitherto known machine supports manufactured only as a steel construction in conventional manner, the machine support shown in FIG. 2 in a cross-section representation offers among others the great advantage of a higher damping power and an increased stiffness.

Figure 3:
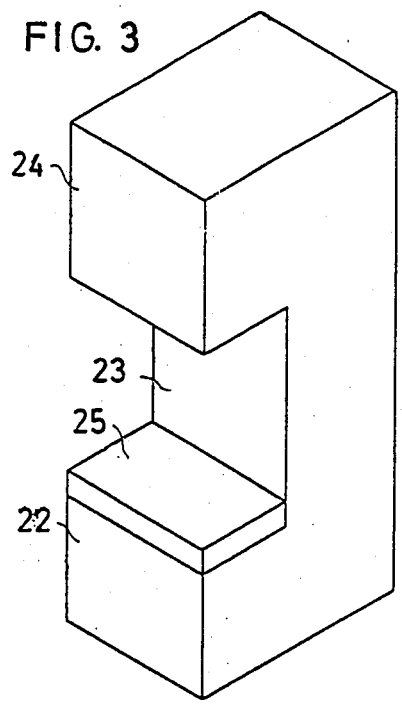
FIG. 3 shows a machine support according to the invention comprising a lower part of the support, a column and an upper part of the support.

FIG. 3 shows a machine support according to the invention wherein the upper part 24 projects laterally over the column 23 so that the lower part 22 of the support, the column 23 and the upper part 24 of the support form a vertical C. A working plate 25 of steel (shown in a very simplified manner) is provided on the lower part 22 of the support on which are mounted further parts necessary for the operation of the machine (not shown in the Figure).

Figure 4:
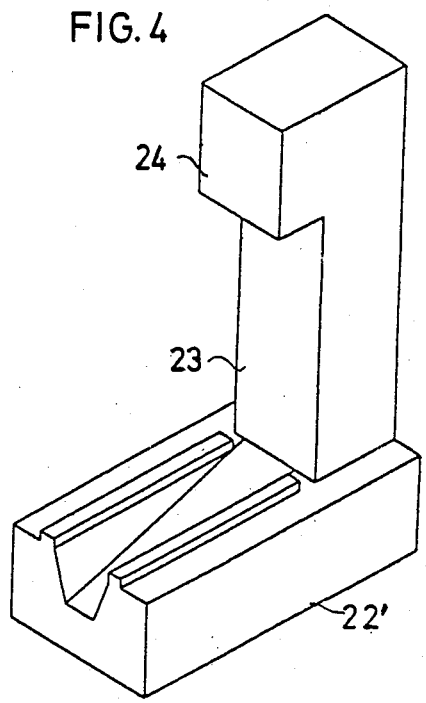
FIG. 4 shows a variation of the embodiment shown in FIG. 3.

FIG. 4 shows an embodiment similar to FIG. 3 wherein, however, the lower part 22' of the support consists of an iron construction filled up with methacrylate resin.

Figure 5:
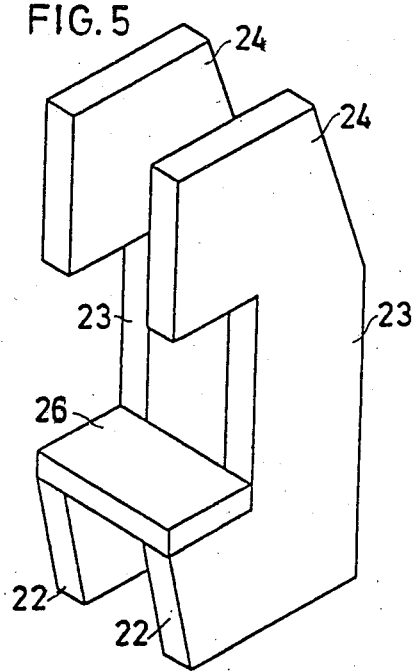
FIG. 5 shows another variation of the embodiment shown in FIG. 3.

FIG. 5 shows an embodiment wherein two C-shaped individual supports are combined by means of a working plate 26 to form a double-support, each support comprising a lower part 22 of the support, a column 23 and an upper part 24 of the support. The working plate 26 can either be made of acrylic concrete or be a steel construction which might be filled up with acrylic concrete.

Figure 6:
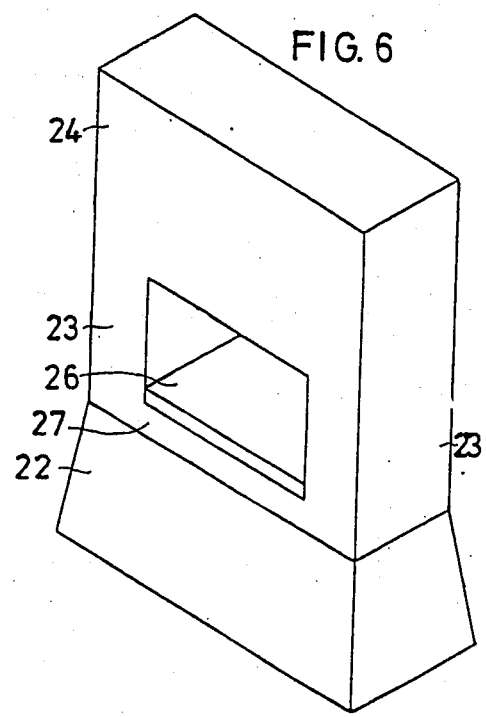
FIG. 6 shows an embodiment according to the invention where the upper part of the support and the lower part of the support are connected by two columns.

FIG. 6 shows an embodiment of a machine support with a symmetrical structure, a so-called portal form. In this embodiment the lower part 22 of the support and the upper part 24 of the support are combined by two columns 23. In this embodiment upper part 24 of the support, columns 23 and a strip 27 connecting them in their lower section are made in one piece of the same material. A working plate 26 is also provided. Referring to its shape the embodiment as shown in FIG. 6 corresponds to a combination of two C-shaped machine supports arranged mirror-inverted.

Figure 8:
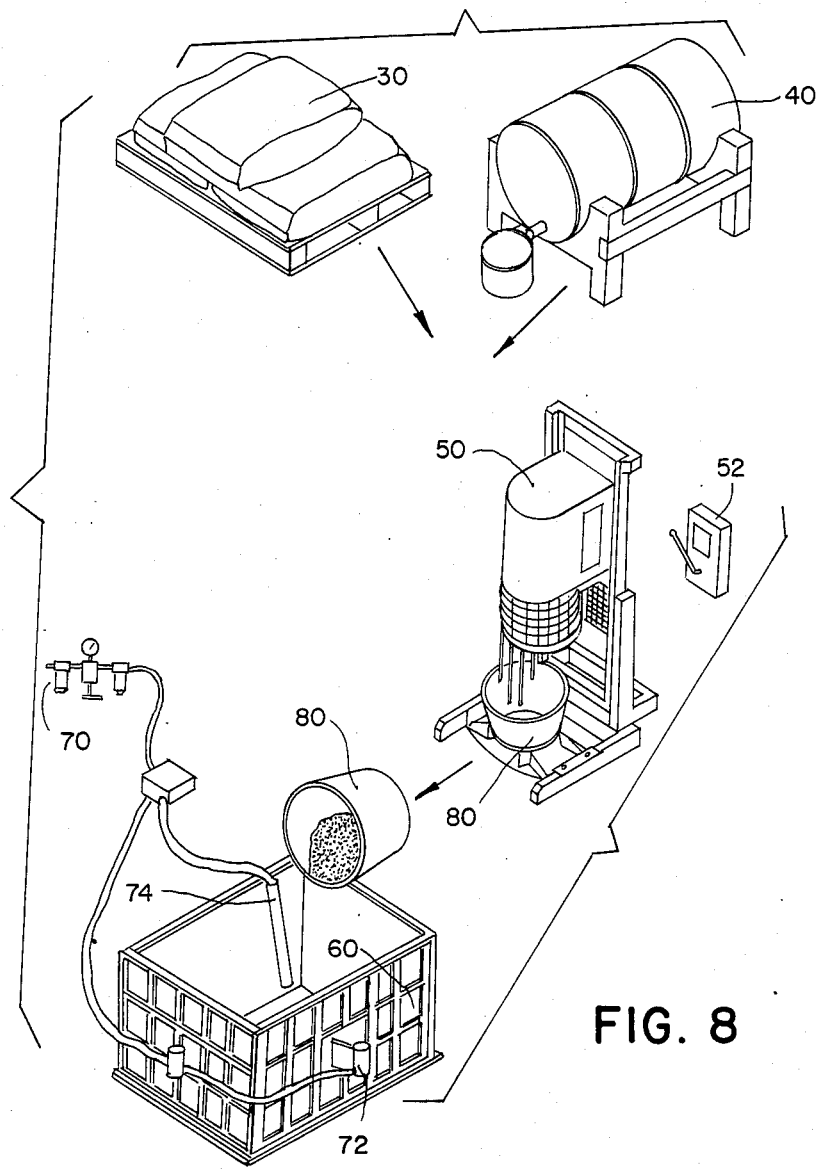
FIG. 8 is a schematic illustration of the process according to the invention.

FIG. 8 is a scheme illustrating the process according to the invention. The scheme shows packing units 30 containing a filler component essentially consisting of the aggregates and a dry organic peroxide thoroughly admixed therewith. A barrel 40 contains a liquid binding component essentially consisting of a polymerizable methacrylate reaction monomer having a dynamic viscosity of less than 10 mPas (10 cP) and of an aromatic tertiary amine thoroughly dissolved therein. A predetermined amount of the dry filler component and a predetermined amount of the liquid binding component are introduced into a mixing container 80. The components contained in the mixing container 80 are positively mixed by a mixer 50, such as a paddle mixture. The electric power supply for the motor of the mixer 50 is shown at 52. Immediately upon completion of the mixing process the resulting mixture is put into a form 60 having a shape corresponding to that of the high-quality machine part to be manufactured. Vibrators 72 at the outside of the form 60 and/or immersion vibrators 74 are provided to densify the mixture in the form 60. The vibrators 72, 74 are driven by a compressed air supply 70. After compacting with the vibrators, the hardening process is finished in about 1 hour, and the produced machine part can be demolded and is ready for use.

Figure 7:
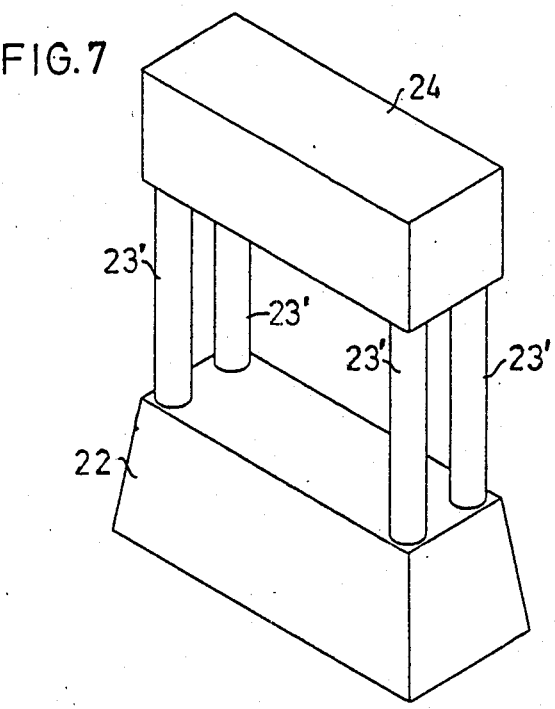
FIG. 7 shows a variation of the embodiment of FIG. 6 comprising four columns between upper part of the support and lower part of the support.

FIG. 7 shows an embodiment of a machine support in a portal form according to the invention wherein lower part 22 and upper part 24 of the machine support are connected by means of four columns 23' of acrylic concrete.

The process for manufacturing machine supports according to the invention is characterized by the following advantages:

1. The speed of the curing process can be varied within relatively wide limits by an appropriate proportioning of the starter system. In particular it has been found that already after one hour the curing can be achieved to such an extent that the machine support can be demoulded. Consequently a mass production can be performed with only one mould. This is of a great economic importance with regard to the extreme high costs of the moulds for machine supports of complicated shape.

2. Machine supports of acrylic concrete offer the great advantage to make it possible to fabricate certain structural parts as basic types and to produce them for stock. Thus a great flexibility is obtained as the basic type can later be easily adapted or completed to meet all requirements of the special task or of the intended use by an additional manufacturing and attachment of further structural parts.

3. Compared to machine supports of the cement concrete, the machine support according to the invention offers the advantage that it absorbs practically no humidity and thus resists to aggressive media, e.g. cutting oil emulsions.

4. Compared to machine supports of gray cast iron or cast steel or welded steel constructions, the machine support according to the invention has an essentially higher damping power, which is at least six times higher, so that when doing lathe work even at substantially increased cutting speed no chatter marks appear.

5. Machine supports comprising a methacrylate monomer polymerizing at room temperature and having a dynamic viscosity of less than 10 mPas 2 cP, preferably of less than 2 mPas, give a high flexural strength and at the same time a high damping power. This is especially important for the columns as these are stressed by tensile forces, and in the case of C-shaped supports the columns are stressed by bending strengths.

While specific embodiments of the invention have been shown and described in detail to illustrate the application of the principles of the invention, it will be understood that the invention may be embodied otherwise without departing from such principles.

What is claimed is:

1. Process for manufacturing machine parts, e.g. machine supports, by means of polymer concrete on the basis of liquid methacrylate monomer polymerizing at room temperature and of aggregates, characterized in that the liquid methacrylate monomer used is a monomer with a dynamic viscosity of less than 10 mPas 10 cP and that to said monomer and/or to the aggregates is admixed a starter system forming radicals which comprises peroxide, wherein the polymer concrete is poured into a mold or form corresponding to the shape of the machine part to be manufactured and is removed after hardening, further characterized in that the starter system comprises an organic peroxide and an aromatic tertiary amine.

2. Process according to claim 1 characterized in that the monomer used is a monomer with a viscosity ranging between 1 and 10 mPas/and 10 cP.

3. Process according to claim 1 characterized in that a pulverized organic peroxide is admixed to a powdered polymer of methacrylate.

4. Process according to claim 3 characterized in that a pulverized organic peroxide is admixed to a powdered polymer of methyl methacrylate.

5. Process according to claim 3 characterized in that the aromatic tertiary amine used is dissolved in the methacrylate monomer.

6. Process according to claim 1 characterized in that a methacrylate monomer containing bi-functional or tri-functional methacrylates is used as a so-called cross-linking agent.

7. Process according to claim 1 characterized in that the mixture of aggregates contains fibres.

8. Process according to claim 1 characterized in that the mixture of aggregates contains metal fibres.

9. Process according to claim 1 characterized in that the machine part is a machine support in which plate-shaped structural parts (5, 6, 7, 9) are embedded into the the polymer concrete being molded.

10. Process according to claim 9 characterized in that plate-shaped structural parts (5, 6, 7, 9) of steel or plastic material are inserted into the surface.

11. The process of claim 1 wherein after hardening of the molded product an additional part is molded thereto by pouring a further amount of the mixture into an additional form or mold attached to the hardened product.

12. The method of claim 1 wherein the step of pouring the mixture into the mold or form or construction is interrupted, whereby at first only a part of the mixture is poured into the mold, followed by a further part of the mixture after insertion into the mold of intercalations.

13. Process for manufacturing machine parts, e.g. machine supports, by means of polymer concrete on the basis of a synthetic binding medium and of aggregates, comprising the steps of:
mixing the aggregates with the synthetic binding medium,
filling the mixture into a mold or form corresponding to the shape of the machine part to the manufactured,
and demolding after hardening,
wherein the synthetic binding medium is a methacrylate resin polymerizing at room temperature and having a dynamic viscosity of less than 20 mPas (10 cP) and an adequate starter system for the methacrylate resin is added to and admixed to the mixture consisting of the aggregates and the methacrylate, and
wherein after hardening of the molded product an additional part is molded thereto by pouring a further amount of the mixture into an additional form or mold attached to the hardened product.

14. The method of claim 13 wherein the step of pouring the mixture into the mold or form or construction is interrupted, whereby at first only a part of the mixture is poured into the mold, followed by a further part of the mixture after insertion into the mold of intercalations.

15. Method of manufacturing high-quality machine supports comprising the steps of:
mixing dry aggregates of concrete with a dry organic peroxide to form a dry filler component,
dissolving an aromatic tertiary amine into a liquid polymerizable methacrylate reaction monomer to form a liquid binding component having a dynamic viscosity of less than 10 mPas (10 cP),
admixing the dry filler component with the liquid binding component in predetermined portions,
pouring the mixture of dry filler component and liquid binding component into a mold or form corresponding to the shape of the machine part to be manufactured, and
removing the molded product after hardening.

16. The method of claim 15 wherein the step of mixing dry filler components further comprises,
mixing a dry polymer methacrylate powder with the dry aggregates of concrete and the dry organic peroxide.

17. The method of claim 15, further comprising the step of densifying the mixture while pouring the mixture into the mold or form.

18. The process of claim 15 wherein after hardening of the molded product an additional part is molded thereto by pouring a further amount of the mixture into an additional form or mold attached to the hardened product.

19. The method of claim 15 wherein the step of pouring the mixture into the mold or form or construction is interrupted, whereby at first only a part of the mixture is poured into the mold, followed by a further part of the mixture after insertion into the mold of intercalations.

20. Method of manufacturing high-quality machine supports comprising the steps of:
mixing dry aggregates of concrete with a dry organic peroxide to form a dry filler component,
dissolving an aromatic tertiary amine into a liquid polymerizable methacrylate reaction resin to form a liquid binding component having a dynamic viscosity of less than 10 mPAS (10 cP),
admixing the dry filler component with the liquid binding component in predetermined portions,
pouring the mixture of dry filler component and liquid binding component into a prefabricated iron or steel construction being part of the product to be manufactured.

* * * * *